United States Patent
Dautartas et al.

(10) Patent No.: US 6,731,386 B2
(45) Date of Patent: May 4, 2004

(54) MEASUREMENT TECHNIQUE FOR ULTRA-THIN OXIDES

(75) Inventors: Mindaugas Fernand Dautartas, Blacksburg, VA (US); George John Przybylek, Douglasville, PA (US)

(73) Assignee: Agere Systems Inc., Allentown, PA (US)

( * ) Notice: Subject to any disclaimer, the term of this patent is extended or adjusted under 35 U.S.C. 154(b) by 640 days.

(21) Appl. No.: 09/754,611

(22) Filed: Jan. 4, 2001

(65) Prior Publication Data

US 2002/0085214 A1 Jul. 4, 2002

(51) Int. Cl.[7] .............................................. G01B 11/06
(52) U.S. Cl. ........................................ 356/369; 356/630
(58) Field of Search ................................ 356/369, 630, 356/632, 503, 504

(56) References Cited

U.S. PATENT DOCUMENTS

| | | | |
|---|---|---|---|
| 4,582,431 A | * | 4/1986 | Cole .......................... 356/632 |
| 4,828,391 A | * | 5/1989 | Zultzke et al. ............... 356/632 |
| 4,878,755 A | * | 11/1989 | Siegmund et al. .......... 356/632 |
| 4,999,014 A | | 3/1991 | Gold et al. |
| 5,101,111 A | | 3/1992 | Kondo |
| 5,120,966 A | | 6/1992 | Kondo |
| 5,438,415 A | | 8/1995 | Kazama et al. |
| 5,485,091 A | | 1/1996 | Verkuil |
| 5,486,701 A | | 1/1996 | Norton et al. |
| 5,740,226 A | | 4/1998 | Komiya et al. |
| 5,798,837 A | | 8/1998 | Aspnes et al. |
| 5,835,221 A | | 11/1998 | Lee et al. |
| 5,900,939 A | | 5/1999 | Aspnes et al. |
| 5,962,079 A | | 10/1999 | Koberstein et al. |
| 5,963,326 A | | 10/1999 | Masao |
| 5,973,787 A | | 10/1999 | Aspnes |
| 6,104,486 A | | 8/2000 | Arimoto |
| 6,222,199 B1 | * | 4/2001 | Freeouf ................ 250/559.27 |

* cited by examiner

Primary Examiner—Richard A. Rosenberger
(74) Attorney, Agent, or Firm—Wendy W. Koba

(57) ABSTRACT

A method of measuring the thickness of ultra-thin (e.g., <200 Å) oxide formed on a semiconductor device uses a reference sample (i.e., another silicon wafer) which has been pre-processed to include a relatively thick oxide surface layer. The thickness of the reference oxide (t) is measured using any conventional technique (such as an ellipsometer). An ultra-thin oxide is then simultaneously formed on both the reference sample and semiconductor device. The total oxide thickness (T) of the dual-layer structure on the reference sample is then measured (again, using any conventional technique), and the difference between the two measured values ($T-t=\delta$) is defined as the thickness of the ultra-thin oxide layer.

6 Claims, 1 Drawing Sheet

MEASUREMENT TECHNIQUE FOR ULTRA-THIN OXIDES

TECHNICAL FIELD

The present invention relates to a measurement technique for ultra-thin oxides and, more particularly, to a technique that utilizes a monitor sample in conjunction with a device-to-be measured to provide for an accurate measurement of a deposited oxide film.

BACKGROUND OF THE INVENTION

In the prior art, there has been considerable interest in developing methods and apparatus for measuring the thickness of thin films on substrates. This need is particularly acute in the semiconductor manufacturing industry where extremely thin films are deposited on silicon substrates.

One technique for measuring such films is defined broadly as "ellipsometry". In an ellipsometer, a probe beam, having a known polarization, is directed to reflect off the surface of the film being measured at an oblique angle. The thickness of the film layer on the substrate will affect the polarization state of the reflected beam. That is, there will be a change in relative phase shift between the "P" wave, which is a vibration component parallel to the plane of incidence, and the "S" wave, which is a vibration component perpendicular to the plane of incidence, as well as the change in amplitude ratio between the two waves. Therefore, by measuring the polarization state of the reflected beam, information about the thickness of the film layer can be derived.

Ellipsometers are quite useful for providing a relatively quick and non-invasive method of measuring film thickness. However, in most practical measurement systems, an error in the range of ±30% can be expected. As film thicknesses become increasingly shallower (i.e., less than 200 Å), other techniques must be developed that exhibit a smaller range of error.

SUMMARY OF THE INVENTION

The need remaining in the art is addressed by the present invention, which relates to a measurement technique for ultra-thin oxides and, more particularly, to a technique that utilizes a monitor sample in conjunction with a device-to-be measured to provide for an accurate measurement of a deposited ultra-thin oxide film.

In accordance with the present invention, a reference sample (such as a silicon substrate) is processed to include (either by growth or deposition, for example) an oxide layer with a thickness ("t") that is relatively easy for a conventional ellipsometer to measure. The reference sample and the actual production wafer(s) are then subjected to the same process for growing an ultra-thin oxide film, where in the case of the reference sample, the ultra-thin oxide will grow over the previously-formed oxide. A conventional ellipsometer can then be used again to measure the total thickness ("T") on the reference sample, where the difference between these two values (T−t) is then defined as the thickness ("δ") of the ultra-thin film oxide.

It is an aspect of the present invention that any suitable type of measurement tool can be used to determine the thickness of the oxide layers formed on the reference sample, as long as the measurement tool exhibits sufficient resolution to be able to distinguish between the thickness prior to and after growth of the thin-film oxide.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
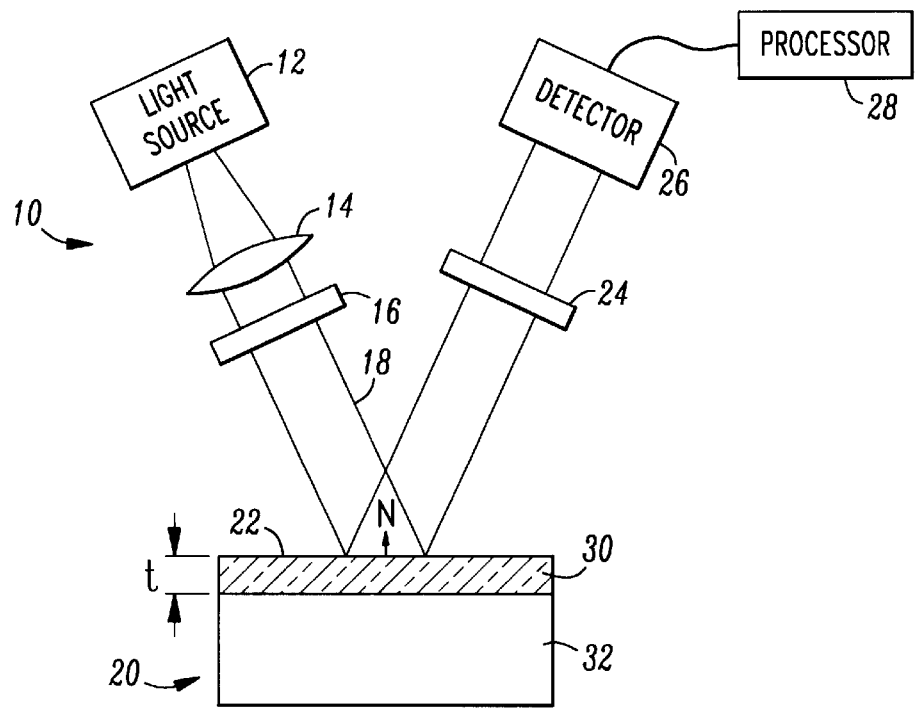
FIG. 1 illustrates a conventional ellipsometer arrangement that may be used to measure the thickness of an oxide layer formed on, as shown, as reference sample.

An ellipsometer 10 as shown in FIG. 1 includes a light source 12 (for example, a HeNe laser), a lens 14 for collimating the output from source 12 and a first polarizer 16 for providing an output beam 18 of a known polarization state (e.g., an "S" polarized wave) from collimated beam exiting lens 14. The beam is then incident on, and reflects from, a reference sample 20. The azimuth angle of first polarizer 16 is oriented so that the plane of the electric vector associated with linearly polarized beam 18 exiting from first polarizer 16 is at a known angle with respect to the plane of incidence defined by the propagation direction of beam 18 and the normal N to surface 22 of reference sample 20. The azimuth angle is preferably selected to be on the order of 70° because the sensitivity is optimized when the reflected intensities of the P and S polarized components are approximately balanced. Linearly polarized beam 18, as shown in FIG. 1, then reflects off of sample 20 at an oblique angle symmetric with the incident angle about the normal N. Beam 18 then passes through a second polarizer 24 and is received by a detector 26 which determines the received polarization state of beam 18. Second polarizer 24 may be mounted on a rotatable platform so that the detector signal can be used to accurately measure the linear polarization component of the reflected beam. A processor 28 then compares the received polarization state with the original polarization state and uses this information to determine the thickness of an oxide layer on the surface of reference sample 20.

In accordance with the present invention, reference sample 20 is an element formed to include a reference surface oxide 30 having a predetermined thickness t that is associated with the most sensitive range of the ellipsometer used to perform the measurement. Preferably, reference sample 20 comprises a silicon wafer 32 with a silicon dioxide material formed as reference surface oxide 30. When using a HeNe laser as light source 12, it is important that the thickness t of surface oxide 30 not be close to the material/operating wavelength dependent order thickness, which for $SiO_2$ is about 2800 Å. In a preferred embodiment of the present invention, therefore, a reference surface oxide 30 having a thickness t in the range of 1000–1400 Å is appropriate.

Figure 2:
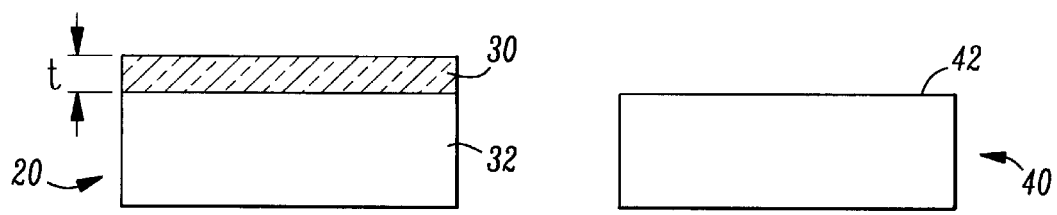
FIG. 2 is a side-by-side illustration of both a reference sample and production wafer, prior to forming an ultra-thin oxide on the production wafer.

Once the thickness of reference oxide layer 30 has been determined, reference sample 20 may be processed with one or more production wafers and used to determine the thickness of an ultra-thin oxide deposited on the production wafers. FIG. 2 illustrates both reference sample 20 and a production wafer 40. For the purposes of the present discussion, it will be presumed that production wafer 40 comprises a silicon wafer and that it is desired to form an ultra-thin oxide on surface 42 of wafer 40. It is to be understood however, that wafer 40 is merely representative and the measurement technique of the present invention is useful with wafers/devices at various stages in the manufacturing process, where an exemplary wafer may have been processed to include various other semiconductor regions and features.

Figure 3:
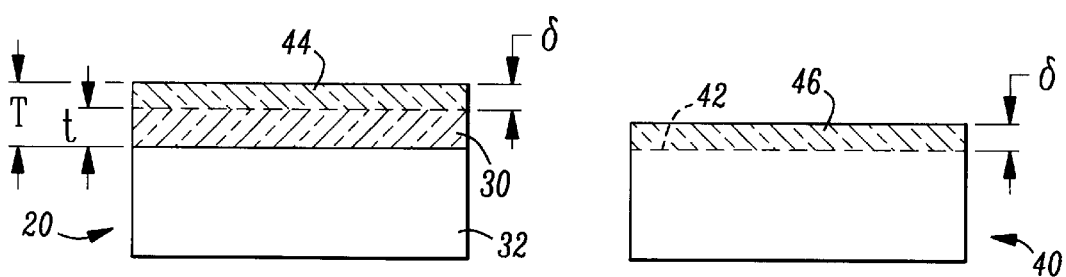
FIG. 3 is side-by-side illustration of both the reference sample and the production wafer, subsequent to the formation of an ultra-thin oxide on both the reference sample and the production wafer.

FIG. 3 illustrates both reference sample 20 and production wafer 40 subsequent to the growth of an ultra-thin oxide on the respective surfaces. Any suitable process may be used to grow the oxide and is not relevant to the measurement technique of the present invention. As shown, reference sample 20 now comprises a dual-layer oxide comprising both reference oxide layer 30 and an ultra-thin layer 44. Production wafer 40 has been processed with reference sample 20 and now comprises an ultra-thin oxide layer 46 grown to cover surface 42. In accordance with the teachings of the present invention, the thickness of ultra-thin oxide layer 46 can be determined by re-measuring the complete thickness of the dual-layer oxide on reference sample 20 and subtracting the known thickness t of reference oxide layer 30. Referring to FIG. 3, the total oxide thickness T on reference sample 20 will be the combination of both t (the thickness of original oxide layer 30) and $\delta$ (the thickness of grown ultra-thin oxide layer 42). Thus, by subtracting t from T, the value of $\delta$ can be determined. Since both ultra-thin oxide layers 42 and 44 were grown at the same time under identical process conditions, the thickness of oxide layer 46 on production wafer 40 will be the same value $\delta$.

It is to be understood that the measurement technique of the present invention is useful with virtually any arrangement or type of ellipsometer currently used, or developed in the future, to measure oxide thickness. For example, a variable angle scanning ellipsometer (VASE) that may more accurately determine thickness variations over the surface of a measurement sample, may be used and a set of measurements for a reference oxide stored and then compared with a set of measurements performed subsequent to the growth of an ultra-thin oxide.

What is claimed is:

1. A method of measuring the thickness ($\delta$) of an ultra-thin oxide grown on a surface of a semiconductor device, the method comprising the steps of:
   a) providing a reference sample device including a top major surface;
   b) forming a relatively thick reference oxide on the top major surface of said reference sample device;
   c) measuring the thickness (t) of said relatively thick reference oxide;
   d) providing a semiconductor device;
   e) simultaneously forming, on both said semiconductor device and said reference sample, an ultra-thin oxide layer, using identical formation conditions;
   f) measuring the total thickness (T) of both said relatively thick reference oxide and the ultra-thin oxide layers on said reference sample; and
   g) subtracting the initial thickness (t) of said relatively thick reference oxide from said total thickness (T) to determine the thickness ($\delta$) of the ultra-thin oxide layer formed on the semiconductor device.

2. The method as defined in claim 1 wherein in performing steps c) and f) an ellipsometer is used to measure the oxide layer thicknesses on the reference sample.

3. The method as defined in claim 2 wherein a HeNe ellipsometer source is used to measure the oxide layer thicknesses.

4. The method as defined in claim 1 wherein in performing step a) a silicon wafer is provided as the reference sample.

5. The method as defined in claim 1 wherein in performing step b) an oxide having a thickness in the range of 1000–1400 Å is formed.

6. The method as defined in claim 1 wherein in performing step e), an ultra-thin oxide having a thickness of at most 200 Å is formed.

* * * * *